US008149248B2

(12) United States Patent
Ko et al.

(10) Patent No.: US 8,149,248 B2
(45) Date of Patent: Apr. 3, 2012

(54) METHOD AND APPARATUS FOR DISPLAYING MAP USING NON-LINEAR COMPRESSION

(75) Inventors: Byeong-Seob Ko, Suwon-si (KR); Joong-Hwan Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 654 days.

(21) Appl. No.: 12/327,153

(22) Filed: Dec. 3, 2008

(65) Prior Publication Data
US 2009/0309900 A1 Dec. 17, 2009

(30) Foreign Application Priority Data

Jun. 16, 2008 (KR) .......................... 10-2008-0056534

(51) Int. Cl.
*G09G 5/00* (2006.01)
*G01C 21/30* (2006.01)
*G01C 21/32* (2006.01)
(52) U.S. Cl. ....................................... 345/660; 701/212
(58) Field of Classification Search .................... 701/212
See application file for complete search history.

(56) References Cited

U.S. PATENT DOCUMENTS

| 5,689,287 | A  | * | 11/1997 | Mackinlay et al. | 345/427 |
|---|---|---|---|---|---|
| 6,081,277 | A  | * | 6/2000  | Kojima | 345/661 |
| 6,417,867 | B1 | * | 7/2002  | Hallberg | 345/660 |
| 6,853,912 | B2 | * | 2/2005  | Han | 701/208 |
| 6,879,331 | B2 | * | 4/2005  | Cragun | 345/661 |
| 6,938,218 | B1 | * | 8/2005  | Rosen | 715/850 |
| 6,956,625 | B2 | * | 10/2005 | Kim | 348/806 |
| 6,975,335 | B2 | * | 12/2005 | Watanabe | 345/660 |
| 7,134,092 | B2 | * | 11/2006 | Fung et al. | 715/779 |
| 7,417,649 | B2 | * | 8/2008  | Fleming et al. | 345/698 |
| 7,568,166 | B2 | * | 7/2009  | Kato | 715/784 |
| 7,667,699 | B2 | * | 2/2010  | Komar et al. | 345/427 |
| 2004/0066393 | A1 | * | 4/2004 | Cragun | 345/660 |
| 2007/0225904 | A1 | * | 9/2007 | Pantalone et al. | 701/207 |
| 2007/0291052 | A1 | * | 12/2007 | van der Meulen | 345/660 |
| 2009/0048777 | A1 | * | 2/2009 | Ebert et al. | 701/212 |

FOREIGN PATENT DOCUMENTS

JP 2007-179006 7/2007
* cited by examiner

*Primary Examiner* — Ryan R Yang
(74) *Attorney, Agent, or Firm* — Staas & Halsey LLP

(57) ABSTRACT

A map displaying method and apparatus to display a map on a screen, the map displaying method including: establishing a first area on the map that is not compressed based on a current location of an object on the map; non-linearly compressing a second area adjacent to the first area at different compression ratios according to a distance from the first area to generate a third area; and displaying the first area and the third area on the screen.

36 Claims, 11 Drawing Sheets

METHOD AND APPARATUS FOR DISPLAYING MAP USING NON-LINEAR COMPRESSION

CROSS-REFERENCE TO RELATED APPLICATIONS

This application claims the benefit of Korean Patent Application No. 2008-56534, filed on Jun. 16, 2008 in the Korean Intellectual Property Office, the disclosure of which is incorporated herein by reference.

BACKGROUND OF THE INVENTION

1. Field of the Invention

Aspects of the present invention relate to a method and apparatus to display a map, and more particularly, to a method and apparatus to efficiently display an electronic map on a display device of limited size.

2. Description of the Related Art

Navigation terminals have become popularized owing to the development of information technology (IT). Navigation terminals calculate a current location based on a signal received from a plurality of global positioning system (GPS) satellites and. Furthermore, navigation terminals direct a route between the current location and a destination via an electronic map.

Navigation terminals are widely used by vehicles frequently requesting a route to be found. In order for a driver of a vehicle that is traveling to check information regarding a current location and a route between the current location and a destination by using the navigation terminal while driving, the navigation terminal should efficiently display the information so that the driver can check the information as fast as possible. Specifically, in order to direct the driver in a particular driving direction at an intersection, the navigation terminal displays more detailed information regarding an intersection area. In order to more efficiently display the intersection area, navigation terminals conventionally display distant and near views to transfer the more detailed information regarding the intersection area to the driver. For example, a screen of a navigation terminal may be divided into two parts in which a distant view is displayed on a left part in order to check an overall route to a destination, and a near view of the intersection area is displayed on a right part so that the driver can obtain important driving information more quickly and conveniently.

However, since the driver has a very short period of time to check information displayed on the screen of the navigation terminal, the driver can be confused by the conventional displaying of distant and near views on the divided screen of the navigation terminal. Also, if a small size screen is divided into two parts and information is displayed on two smaller portions of the small screen, checking the information in a short period of time is more difficult.

Therefore, a map displaying method and apparatus to display more map information on a single screen and enabling a user to easily take in the map information are needed.

SUMMARY OF THE INVENTION

Aspects of the present invention provide a map displaying method and apparatus to more efficiently display information regarding a distant area and a non-distant area on a single screen. Aspects of the present invention also provide a computer-readable recording medium storing a program to execute the method.

According to an aspect of the present invention, there is provided a map displaying method to display a map on a screen, the method including: establishing a first area on the map that is not compressed based on a current location of an object on the map; non-linearly compressing a second area adjacent to the first area at different compression ratios according to a distance from the first area to generate a third area; and displaying the first area and the third area on the screen.

According to an aspect of the present invention, the non-linearly compressing of the second area may include: compressing a first portion of the second area at a first compression ratio and compressing a second portion of the second area, farther from the first area than the first portion, at a second compression ratio, greater than the first compression ratio, to generate the third area.

According to an aspect of the present invention, the non-linearly compressing of the second area may include: compressing a first portion of the second area to display the first portion in a first reduced scale and compressing a second portion of the second area, farther from the first area than the first portion, to display the second portion in a second reduced scale, smaller than the first reduced scale, to generate the third area.

According to an aspect of the present invention, the non-linearly compressing of the second area may include: non-linearly compressing the second area according to a log-scale to generate the third area.

According to an aspect of the present invention, the size of the first area may be determined based on a moving speed of the object.

According to an aspect of the present invention, the first area may include the current location of the object or may exclude the current location of the object.

According to an aspect of the present invention, the first area excluding the current location of the object may be an area a predetermined distance away from the current location of the object in the moving direction of the object.

According to another aspect of the present invention, there is provided a map displaying apparatus to display a map on a screen, the apparatus including: a non-compression area establishing unit to establish a first area on the map that is not compressed based on a current location of an object on the map; a compression area generating unit to non-linearly compress a second area adjacent to the first area at different compression ratios according to a distance from the first area to generate a third area; and a display unit to display the first area and the third area on the screen.

According to another aspect of the present invention, there is provided a computer-readable recording medium having recorded thereon a computer program for executing the method, implemented by at least one computer.

According to another aspect of the present invention, there is provided a map displaying method to display a map including a current location within a first or second area of the map on a screen of a navigation terminal, the method including: non-linearly compressing the second area at different compression ratios according to a distance from the first area to generate a third area without compressing the first area; and displaying the first area and the third area on the screen.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
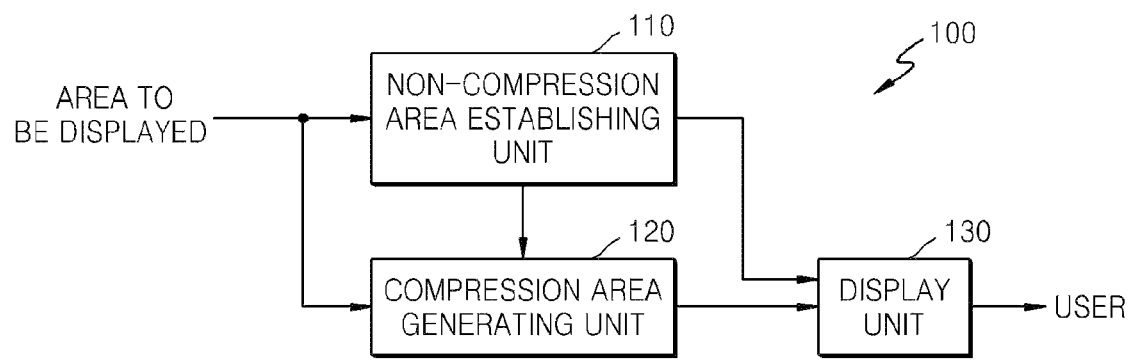
FIG. 1 is a block diagram of a map displaying apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a map displaying apparatus 100 according to an embodiment of the present invention. Referring to FIG. 1, the map displaying apparatus 100 includes a non-compression area establishing unit 110, a compression area generating unit 120, and a display unit 130. Not shown for purposes of simplicity are a GPS unit to determine a location and a storage unit to store map data. While not required, the apparatus can be in a stand alone portable unit, embedded in a vehicle, included in a phone or portable media player, etc. Moreover, certain elements such as the display unit 130 can be separately provided.

The non-compression area establishing unit 110 establishes a first area that is not compressed, but is to be displayed on a screen of the display unit 130 based on a current location of an object on an electronic map. Specifically, the non-compression area establishing unit 110 displays a non-distant area around the current location. However, it is understood that aspects of the present invention are not limited thereto. For example, according to other aspects, the first area can be established based on a distant area that is predetermined distance away from the current location. This will be described in more detail later with reference to FIGS. 9A and 9B.

The compression area generating unit 120 non-linearly compresses a second area adjacent to the first area to generate a third area. This compression will be described in more detail later with reference to FIGS. 2 and 3.

Figure 2:
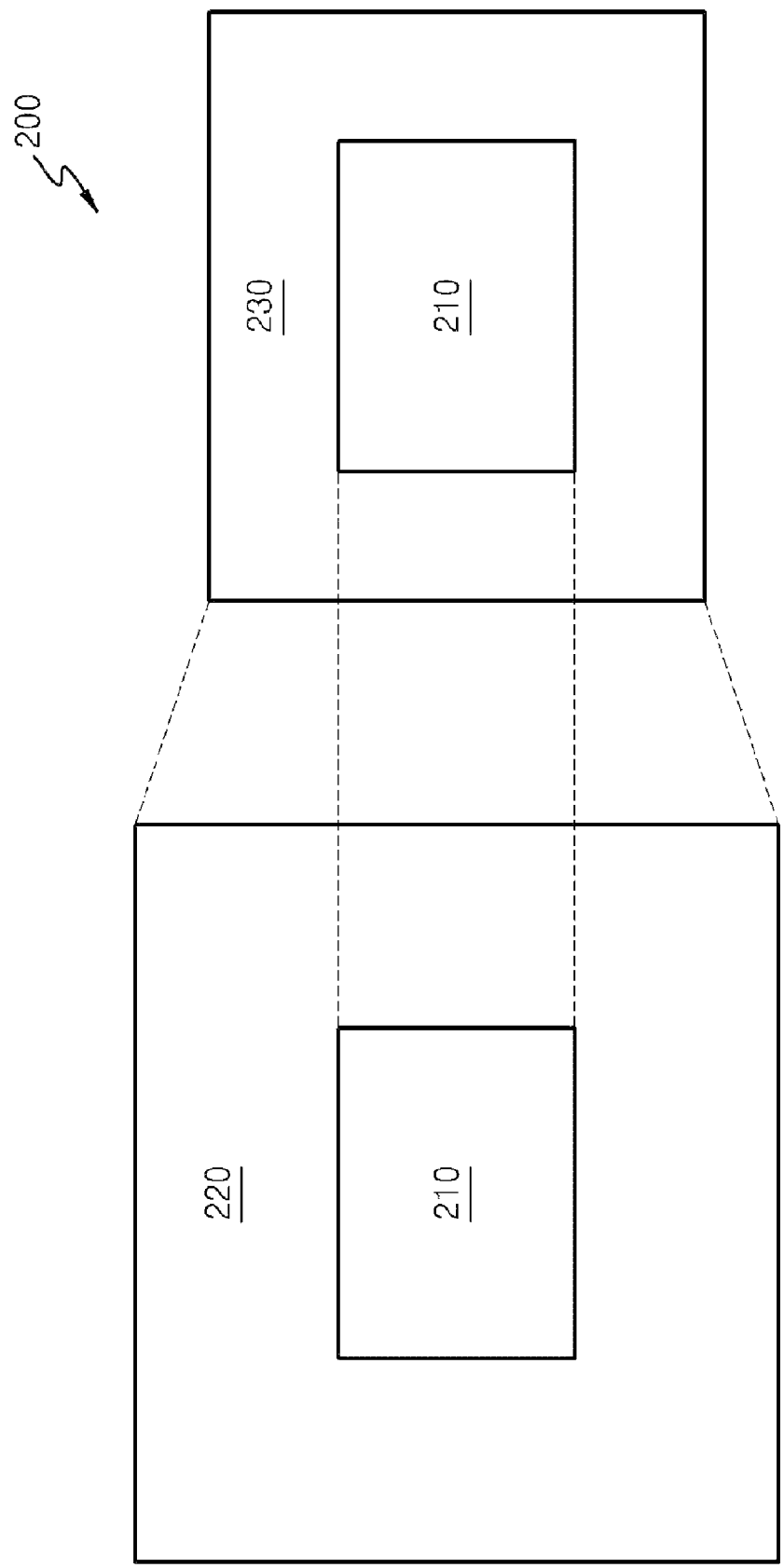
FIG. 2 is a diagram to explain a map displaying method according to an embodiment of the present invention.

FIG. 2 is a diagram to explain a map displaying method according to an embodiment of the present invention. Referring to FIG. 2, a screen 200 of the display unit 130 includes the first area 210 that does not compress a map and the second area 220 that does compress a map. The first area 210, which is generated by the non-compression area establishing unit 110, that is not compressed but is established based on the current location of the object is displayed on the screen 200. The second area 220, adjacent to the first area 210, is non-linearly compressed to generate a third area 230 using the compression area generating unit 120. Accordingly, the first area 210 and the third area 230 are displayed on the screen 200.

The compression refers to the displaying of a broader area on a small screen by reducing a scale of the map to be different from that of the first area 210. The non-linear compression refers to a compressing of the second area 220 at a different compression ratio according to a distance between the first area 210 and the second area 220. For example, the farther the distance between the first area 210 and the second area 220, the higher the compression of the second area 220. Conversely, the nearer the distance between the first area 210 and the second area 220, the lower the compression of the second area 220. Furthermore, if a relatively small reduced scale of the map is used to display an area far away from the first area 210, the second area 220 can be compressed at a higher compression ratio. If a relatively large reduced scale of the map is used to display an area near to the first area 210, the second area 220 can be compressed at a lower compression ratio.

Although, as illustrated in FIG. 2, the first area 210 that is not compressed and is displayed on the screen 200 has a rectangular shape, it is understood that aspects of the present invention are not limited thereto. For example, according to other aspects, the first area 210 can have a different shape (such as a circular shape, an oval shape, a triangular shape, etc.). Moreover, the location of the first area 210 can be at a center of the screen 200 as shown, or can be disposed off center in other aspects.

Figure 3:
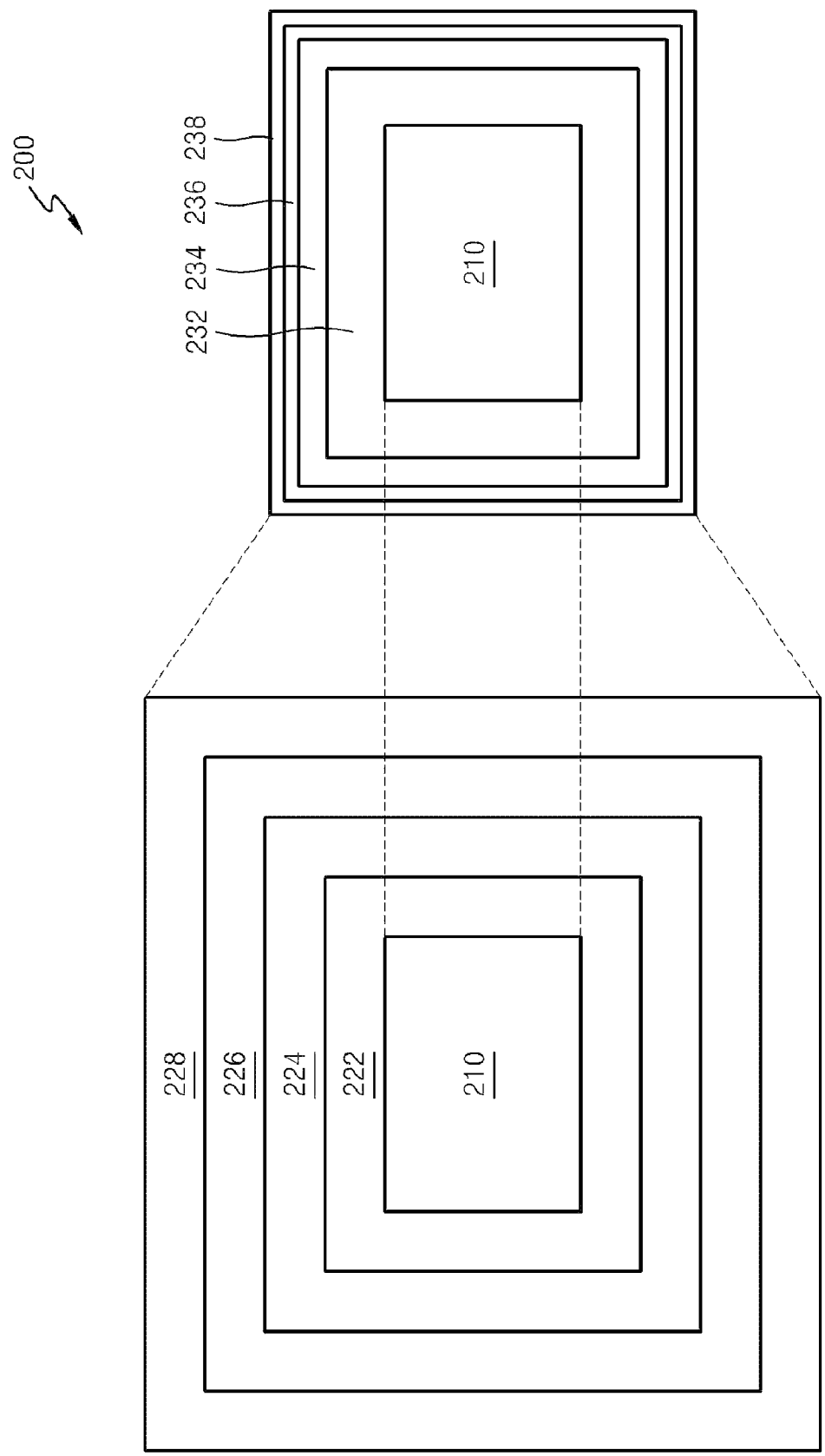
FIG. 3 is a diagram to explain a non-linear compression according to an embodiment of the present invention.

FIG. 3 is a diagram to explain a non-linear compression according to an embodiment of the present invention. Referring to FIG. 3, the first area 210 is displayed on the screen 200 as is, whereas, sub-second areas 222 through 228 adjacent to the first area 210 are compressed as third areas 232 through 238 at different compression ratios according to the distance between the first area 210 and the corresponding one of the sub-second areas 222 through 228. As an example, the sub-second areas 222 through 228 can be non-linearly compressed according to a log-scale. However, it is understood that the compression ratios could be exponentially varied according to distance or can be otherwise varied.

In more detail, the sub-second area 222 that is the nearest from the first area 210 is compressed with a half reduced scale of that of the first area 210, and the sub-second area 224 is compressed with a half reduced scale of that used to compress the sub-second area 222. Then, the sub-second area 226 is compressed with a half reduced scale of that used to compress the sub-second area 224. In the same manner, the sub-second area 228 that is the farthest from the first area 210 is compressed with a half reduced scale of that used to compress the sub-second area 226. Since the scale is reduced at an equal ratio of a half, more map information can be displayed on the screen 200 while minimizing discontinuity between adjacent areas.

In the present embodiment, the second area 220 adjacent to the first area 210 is divided into four sub-second areas 222 through 228 and is non-linearly compressed. However, it is understood that aspects of the present invention are not limited to the four sub-second areas 222 through 228, and according to other aspects, the second area 220 can be divided into a different number of sub-second areas. For example, the second area 220 can be divided into a number greater or less than four sub-second areas.

Accordingly, if the second area 200 is divided into a greater number of sub-second areas and a reduction ratio greater than 1/2 is used, discontinuity between adjacent areas caused by a difference in the reduced scale in each sub-second area is minimized and the map can be non-linearly compressed. The map may be non-linearly compressed according to the log-scale by applying a different reduced scale in units of pixels in order to minimize the discontinuity between adjacent areas caused by the difference in the reduced scale in each sub-second area.

Figure 4:
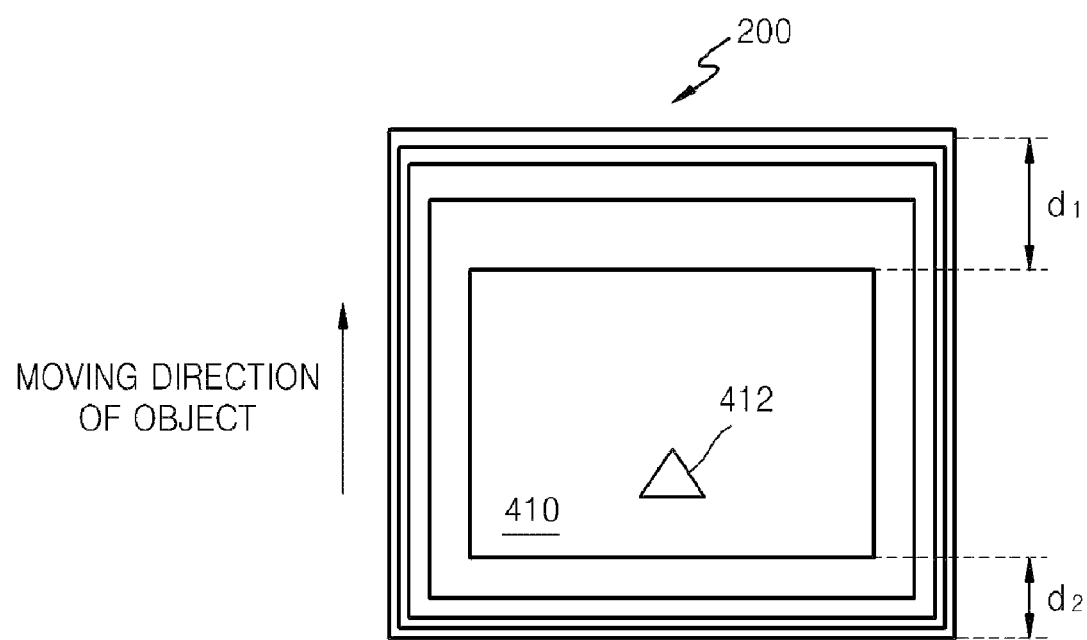
FIG. 4 is a diagram to explain a map displaying method in view of a moving direction of an object according to an embodiment of the present invention.

The non-linear area establishing unit 110 can also establish the first area 110 in view of a moving direction of the object. This will be in more detail described with reference to FIG. 4. FIG. 4 is a diagram to explain a map displaying method in view of a moving direction of an object 412 according to an embodiment of the present invention. Referring to FIG. 4, when the moving direction of the object 412 is towards a top of the screen 200, a first area 410 is established so as to display more area in the moving direction of the object 412. This method assumes that a user who views a map is more interested in an area in a direction of motion of the object 412 than an area that is behind the object 412. Therefore, the first area 410 is established to be located in the bottom of the screen 200 in order to display the area that the object 412 will move to on the screen 200. However, it is understood that the object 412 could be otherwise disposed in the first area 410.

In more detail, the first area 410 is established so that a distance d1 between a boundary of the top of the first area 410 and a boundary of the top of the screen 200 is greater than a distance d2 between a boundary of the bottom of the first area 410 and a boundary of the bottom of the screen 200. Therefore, if the first area 410 is established in view of the moving direction of the object 412, the compression area generating unit 120 non-linearly compresses an area adjacent to the first area 410 to generate a third area. For example, the compression area generating unit 120 establishes an area adjacent to the top of the first area 410 to be greater than areas adjacent to the bottom and both sides of the first area 410 to determine a second area, non-linearly compresses the second area, and generates the third area. According to another embodiment of the present invention, the second area adjacent to the first area 410 is determined to include the same area in each direction as shown in the left of FIG. 2, and the area adjacent to the top of the first area 410 is compressed at a lower compression ratio, so that an area in a forward direction can be more greatly expanded.

Figure 5:
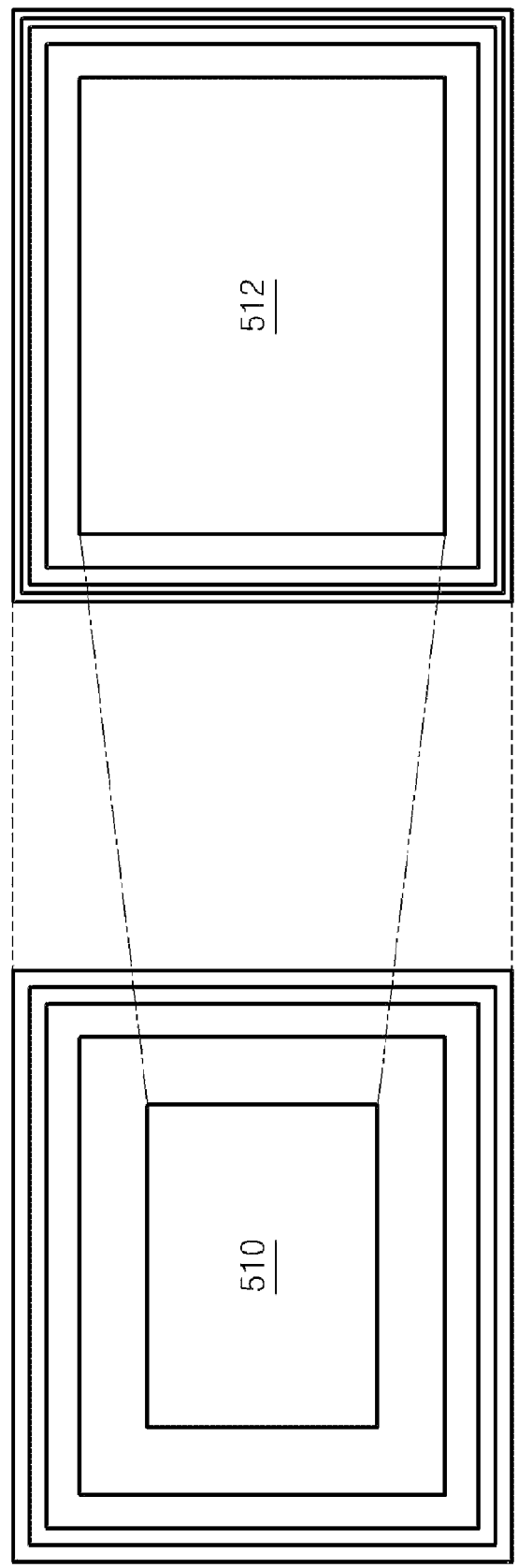
FIG. 5 is a diagram to explain a method of establishing a non-compression area in view of a moving speed of an object according to an embodiment of the present invention.

The non-compression area establishing unit 110 can alternatively or additionally establish the first area 410 in view of a moving speed of the object 412. This will be described in more detail with reference to FIG. 5. FIG. 5 is a diagram to explain a method of establishing a non-compression area in view of a moving speed of an object according to an embodiment of the present invention. Referring to FIG. 5, the higher the moving speed of the object, the greater a distance away from a current location of the object is displayed on a screen. Conversely, the lower the moving speed of the object, the lesser a distance away from the current location of the object is displayed on the screen. This method assumes that if the moving speed of the object is high, a user who views the screen is more interested in the areas a greater distance away from the current location of the object, and if the moving speed of the object is low, the user who views the screen is more interested in the area around the current location of the object.

Accordingly, the non-compression area establishing unit 110 of the present embodiment establishes the size of a first area 510 to be smaller if the moving speed of the object is relatively high (for example, greater than a predetermined speed), and establishes the size of the first area 512 to be greater if the moving speed of the object is relatively low (for example, less than a predetermined speed).

The same area of a map can be established as the first areas 510 and 512, or a different area of the map can be established as the first areas 510 and 512. If a same area of the map (i.e., same distance) is established as the first areas 510 and 512, the first area 512 employed when the moving speed of the object is low is an enlarged view (i.e., zoomed) of the first area 510 that is employed when the moving speed of the object is high. If a different area of the map is established as the first areas 510 and 512, the first areas 510 and 512 each having a different area according to the same reduced scale can be displayed on the screen. In more detail, the first area 512 employed when the moving speed of the object is low includes an area (i.e., distance) greater than the first area 510 employed when the moving speed of the object is high.

In FIGS. 2 through 5, a second area 230 that is non-linearly compressed and is displayed on the screen 200 includes (or surrounds) the first area 210, 510, 512. In more detail, the second area 220 is adjacent to boundaries of the first area 210, 510, 512 in all directions. However, it is understood that according to other aspects, the non-compression area establishing unit 110 can establish the first area 210, 510, 512 of which only one boundary is adjacent to the second area 220, which will be described with reference to FIGS. 6 through 9.

Figure 6:
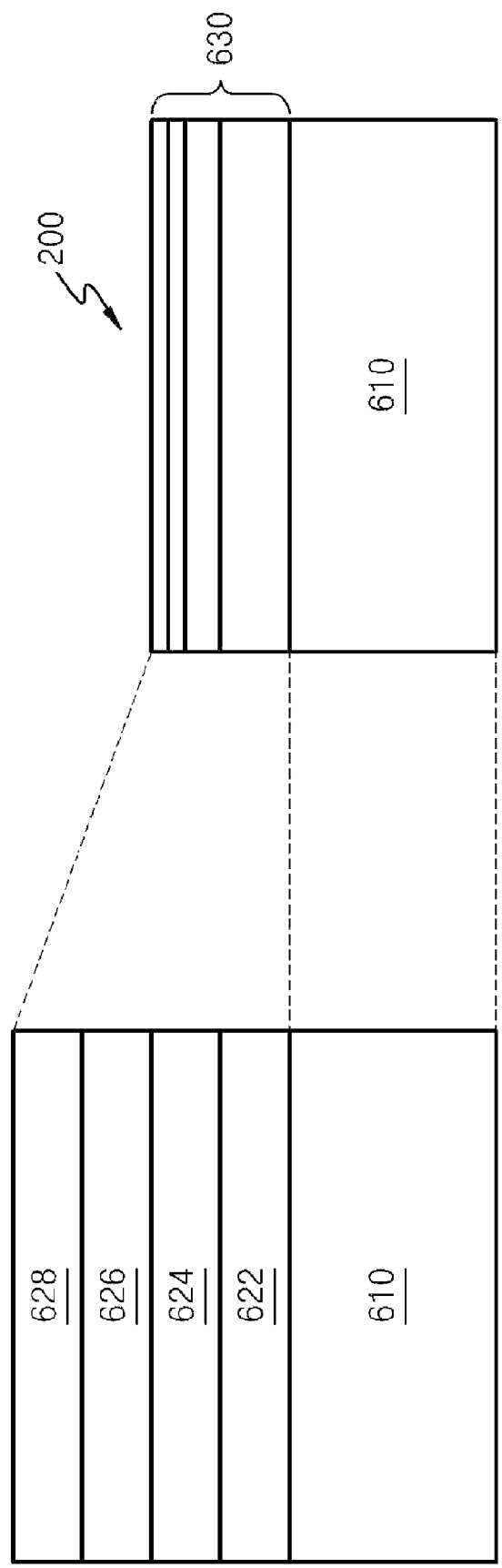
FIG. 6 is a diagram to explain a non-linear compression according to another embodiment of the present invention.

FIG. 6 is a diagram to explain a non-linear compression according to another embodiment of the present invention. Referring to FIG. 6, the non-compression area establishing unit 110 establishes the first area 610 to be adjacent to at least one boundary of the screen 200, as opposed to a first area located in the center of a screen 200 as in FIG. 2. As illustrated, the first area 610 is established adjacent to the bottom boundary of the screen 200, though it is understood that aspects of the present invention are not limited thereto.

The compression area generating unit 120 non-linearly establishes second areas 622 through 628 adjacent to a boundary of the first area 610 (e.g., the top boundary of the first area 610), and generates a third area 630 via a non-linear compression, as described above. That is, the compression area generating unit 120 non-linearly compresses the second areas 622 through 628 at different compression ratios according to a distance between the first area 610 and the respective second areas 622 through 628 to generate the third area 630. Specifically, the compression area generating unit 120 non-linearly compresses the second area 622 that is relatively closer to the first area 610 at a lower compression ratio, and compresses the second area 628 that is relatively farther from the first area 610 at a higher compression ratio. As described with reference to FIG. 3, the second areas 622 through 628 are displayed on the screen 200 in different reduced scales according to a log-scale to generate the third area 630.

According to an aspect of the present invention, if an object moves towards a top of the screen 200, an area adjacent to the top boundary of the first area 610 is assumed as a user's interested area. Thus, the area adjacent to the top boundary of the first area 610 is non-linearly compressed to generate the third area 630.

As shown in FIG. 6, an area adjacent to the first area 610 is divided into four sub-second areas 622 through 628 and is non-linearly compressed. However, the four sub-second areas 622 through 628 are provided as an example. It is understood that aspects of the present invention are not limited thereto, and the area adjacent to the first area 610 can be divided into a different number of sub-second areas. For example, the area adjacent to the first area 610 can be divided into a number greater than four sub-second areas.

As illustrated, a boundary between the first area 610 and the second areas 622 through 628 is a horizontal line dividing the screen 200. It is understood that aspects of the present invention are not limited thereto. For example, the boundary between the first area 610 and the second areas 622 through 629 can be a parabola having a vertex in a top direction of the screen 200. However, it is understood that the boundary can be curved or have other shapes. Also, the boundary between the first area 610 and the second areas 622 through 629 may be established in view of a moving direction of an object. This will be described in detail with reference to FIG. 7.

Figure 7:
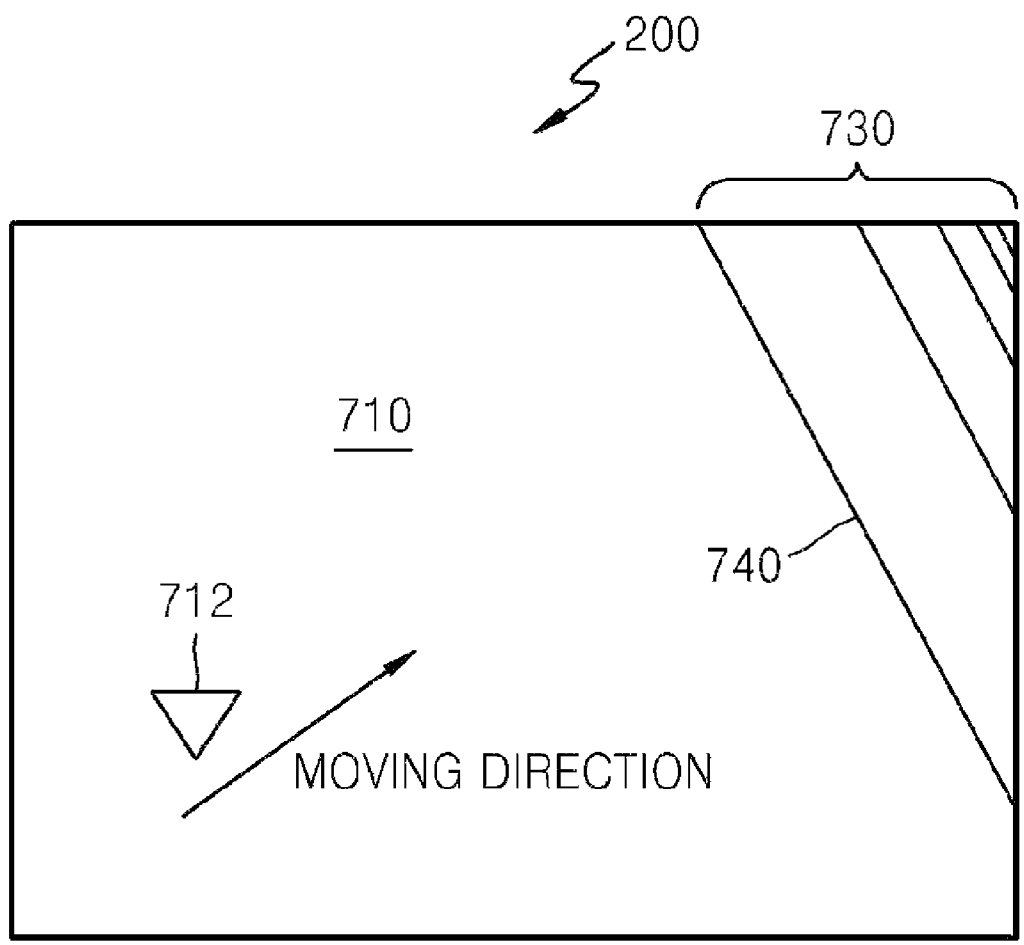
FIG. 7 is a diagram to explain a map displaying method in view of a moving direction of an object according to another embodiment of the present invention.

FIG. 7 is a diagram to explain a map displaying method in view of a moving direction of an object 712 according to another embodiment of the present invention. Referring to FIG. 7, when the non-compression area establishing unit 110 establishes a first area 710 that is not compressed and is to be displayed on the screen 200 adjacent to top, bottom, and left boundaries of the screen 200, and the object 712 moves in a direction up and to the right of the screen, the compression area generating unit 120 of the present embodiment generates a third area 730 so that a boundary 740 between the first area 710 and the non-linearly compressed third area 730 is perpendicular to the moving direction of the object 712.

In more detail, in order to non-linearly compress a distant area a predetermined distance away from a current location of the object 712 that is in a range of the moving direction of the object 712, the compression area generating unit 120 determines a second area so that the boundary 740 between the non-compressed first area 710 and the non-linearly compressed third area 730 is perpendicular to the moving direction of the object 712, and compresses the second area to generate the third area 730.

Also, as described with reference to FIG. 5, the non-compression area establishing unit 110 can establish the size of the first area 710 in view of the moving speed of the object 712 and/or the moving direction thereof so that the first area 710 can be adjacent to at least one boundary of the screen 200. This will be described in detail with reference to FIG. 8.

Figure 8:
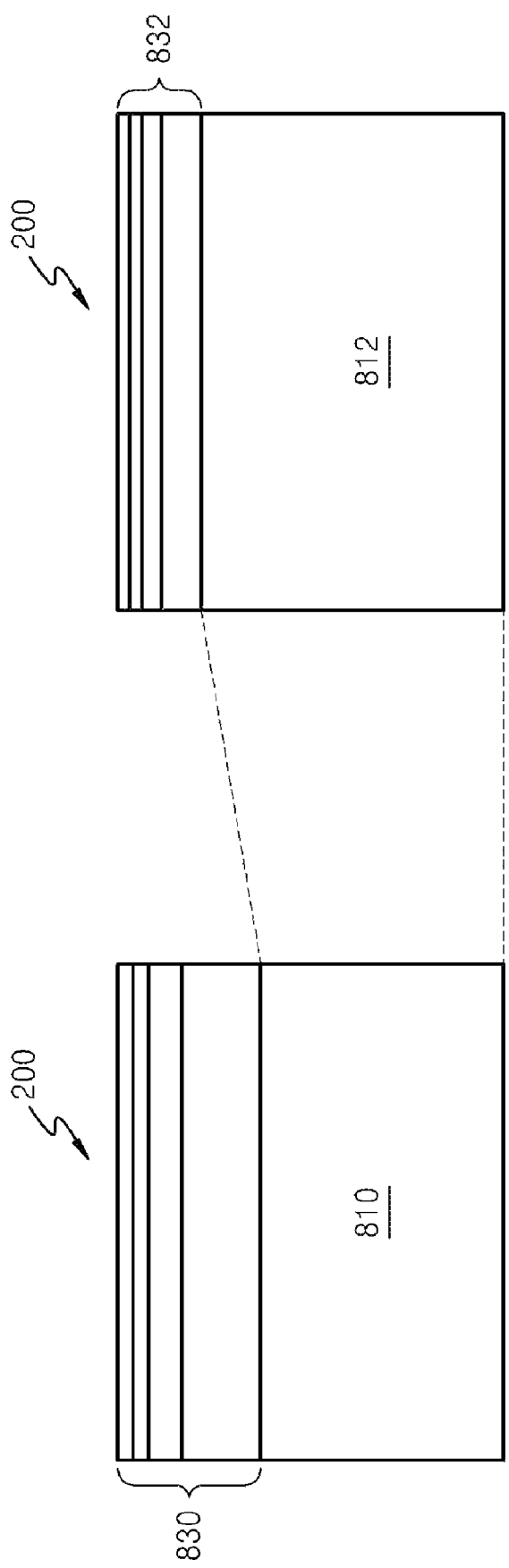
FIG. 8 is a diagram to explain a method of establishing a non-compression area in view of a moving speed of an object according to another embodiment of the present invention.

FIG. 8 is a diagram to explain a method of establishing a non-compression area in view of a moving speed of an object according to another embodiment of the present invention. Referring to FIG. 8, the non-compression area establishing unit 110 establishes first areas 810 and 812 adjacent to bottom, left, and right boundaries of the screen 200. The sizes of the first areas 810 and 812 are determined in view of the moving speed of the object. When the moving direction of the object is towards a top of the screen 200, if the moving speed of the object is high, the first area 810 is established to be relatively smaller, and a non-linearly compressed third area 830 is displayed to be relatively greater on the screen 200. Meanwhile, if the moving speed of the object is low, the first area 812 that is a non-distant area around a current location of the object is established to be relatively greater, and the non-linearly compressed third area 830 is displayed to be smaller on the screen 200.

As described with reference to FIG. 8, according to aspects of the present invention, a same area of a map can be established as the first areas 810 and 812, or a different area of the map can be established as the first areas 810 and 812. Accordingly, if the same area of the map (i.e., same distance) is established as the first areas 810 and 812, the first area 812 is employed when the moving speed of the object is relatively low, and the first area 810 employed when the moving speed of the object is relatively high. If a different area of the map (i.e., different distance) is established as the first areas 810 and 812, the first areas 810 and 812 each having a different area according to the same reduced scale can be displayed on the screen. In more detail, the first area 812 when the moving speed of the object is relatively low has an area greater than the first area 810 when the moving speed of the object is relatively high.

Figure 9A:
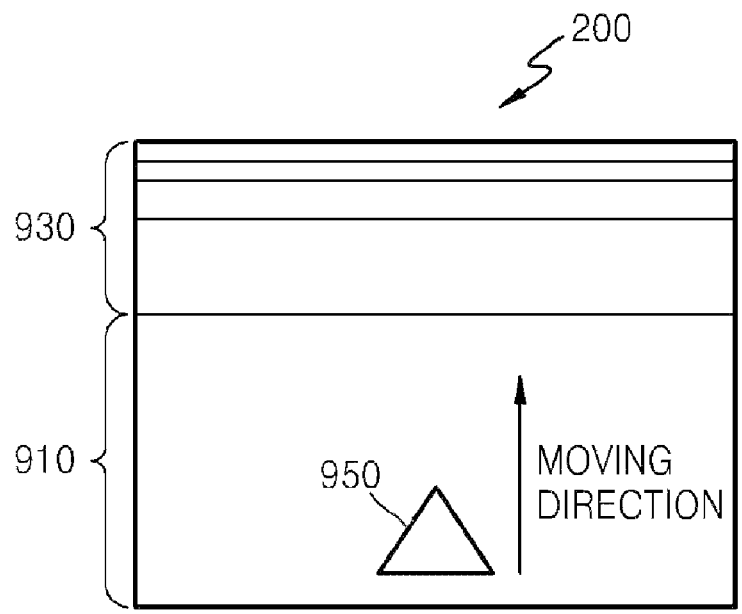
FIGS. 9A and 9B are diagrams to explain a method of arranging a non-compression area and a compression area on a screen according to an embodiment of the present invention.
Figure 9B:
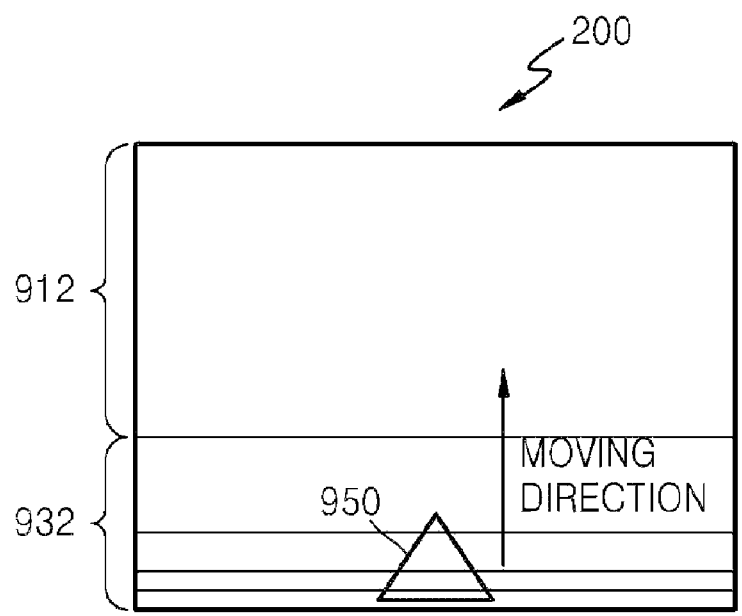

FIGS. 9A and 9B are diagrams to explain a method of arranging a non-compression area and a compression area on the screen 200 according to an embodiment of the present invention. The first area 910 that is not compressed and is displayed on the screen is determined based on a user's current location. As described, a non-distant area including the user's current location can be established as the first area 910. Alternatively, a distant area that is a predetermined distance away from the user's current location can also be established as the first area 912.

Referring to FIG. 9A, the non-compression area establishing unit 110 establishes a non-distant area including a current location of an object 950 as the first area 910. The compression area generating unit 120 non-linearly compresses a distant area a predetermined distance away from the current location of the object 950 to generate a third area 930.

Conversely, referring to FIG. 9B, the non-compression area establishing unit 110 establishes a distant area at a predetermined distance from the current location of the object 950 in a moving direction of the object 950 as the first area 912 that is not compressed and is displayed on the screen 200. The compression area generating unit 120 non-linearly compresses the non-distant area around the current location of the object 950 to generate the third area 932.

For example, when a user's interested area is the non-distant area of the current location of the object 950, determined due to a slow moving speed of the object 950, the first area 910 that is the non-distant area is not compressed and is displayed on the screen 200 as shown in FIG. 9A. On the other hand, when the user's interested area is the distant area a predetermined distance away from the current location of the object 950, determined due to a fast moving speed of the object 950, the first area 910 is compressed and is displayed on the screen 200, and the first area 912 that is the distant area is not compressed and is displayed on the screen 200 as shown in FIG. 9B.

In FIG. 9B, the first area 912 is adjacent to the boundaries of the screen 200. However, according to another embodiment of the present invention, the first area 912 is not adjacent to the boundaries of the screen 200 (as shown in FIG. 3).

As described, when the non-compression area establishing unit 110 establishes the first area that is not compressed and is displayed on the screen 200, and the compression area generating unit 120 non-linearly compresses the second area adjacent to the first area to generate the third area, the display unit 130 displays the first and third areas on the screen 200.

Figure 10:
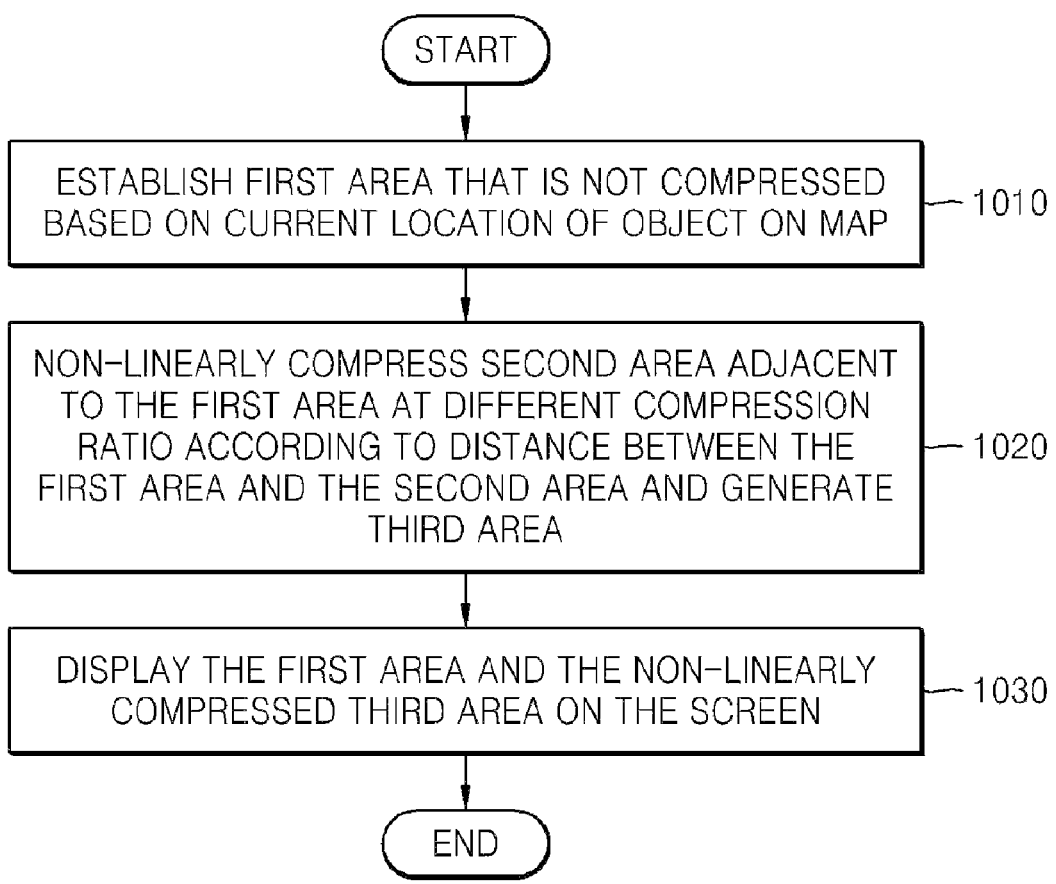
FIG. 10 is a flowchart illustrating a map displaying method according to an embodiment of the present invention.

FIG. 10 is a flowchart illustrating a map displaying method according to an embodiment of the present invention. Referring to FIG. 10, a map displaying apparatus establishes a first area that is not compressed, to be displayed on a screen, based on a current location of an object on a map in operation 1010. The size of the first area may be established in view of a moving direction and/or a moving speed of the object. Furthermore, a non-distant area around the current location of the object or a distant area a predetermined distance away from the current location of the object may be established as the first area. The size and location of the first area are described in detail with reference to FIGS. 4, 5, 7, 9A, and 9B.

The shape of the first area is not limited. For example, the shape of the first area can be a rectangle surrounded by the second area as shown in FIG. 2, a non-rectangle as in FIG. 7, or can be a circle, a square, a triangle, a diamond, etc. Also, an area that is not surrounded by the second area and is adjacent to top, bottom, left, and/or right boundaries of the screen can be established as the first area.

Then, the map displaying apparatus non-linearly compresses the second area adjacent to the first area at a different compression ratio according to a distance between the first area and the second area within the screen 200 to generate a third area in operation 1020. The second area is compressed in a different reduced scale from that of the first area in order to display a greater area on a small screen. In this regard, the second area is non-linearly compressed at different compression ratios (i.e., at a different reduced scale), according to a distance from the first area. For example, the farther the distance from the first area, the higher the compression ratio of the second area, and the nearer the distance to the first area, the lower the compression ratio of the second area. If a small reduced scale of the map is used to display an area far away from the first area, the second area can be compressed at a higher compression ratio. If a large reduced scale of the map is used to display an area near to the first area, the second area can be compressed at a lower compression ratio. In the present embodiment, the second area is non-linearly compressed according to a log-scale so that the area far away from the first area is compressed at a higher compression ratio.

The map displaying apparatus displays the first area and the non-linearly compressed third area on a display device in operation 1030. Since the third area is compressed, relatively more map information can be displayed on the screen as compared to a conventional map displaying apparatus. As described above, the third area is compressed in a different compression ratio according to the distance within the second area to the first area, thereby minimizing discontinuity between areas caused by the compression and displaying of map information.

Figure 11:
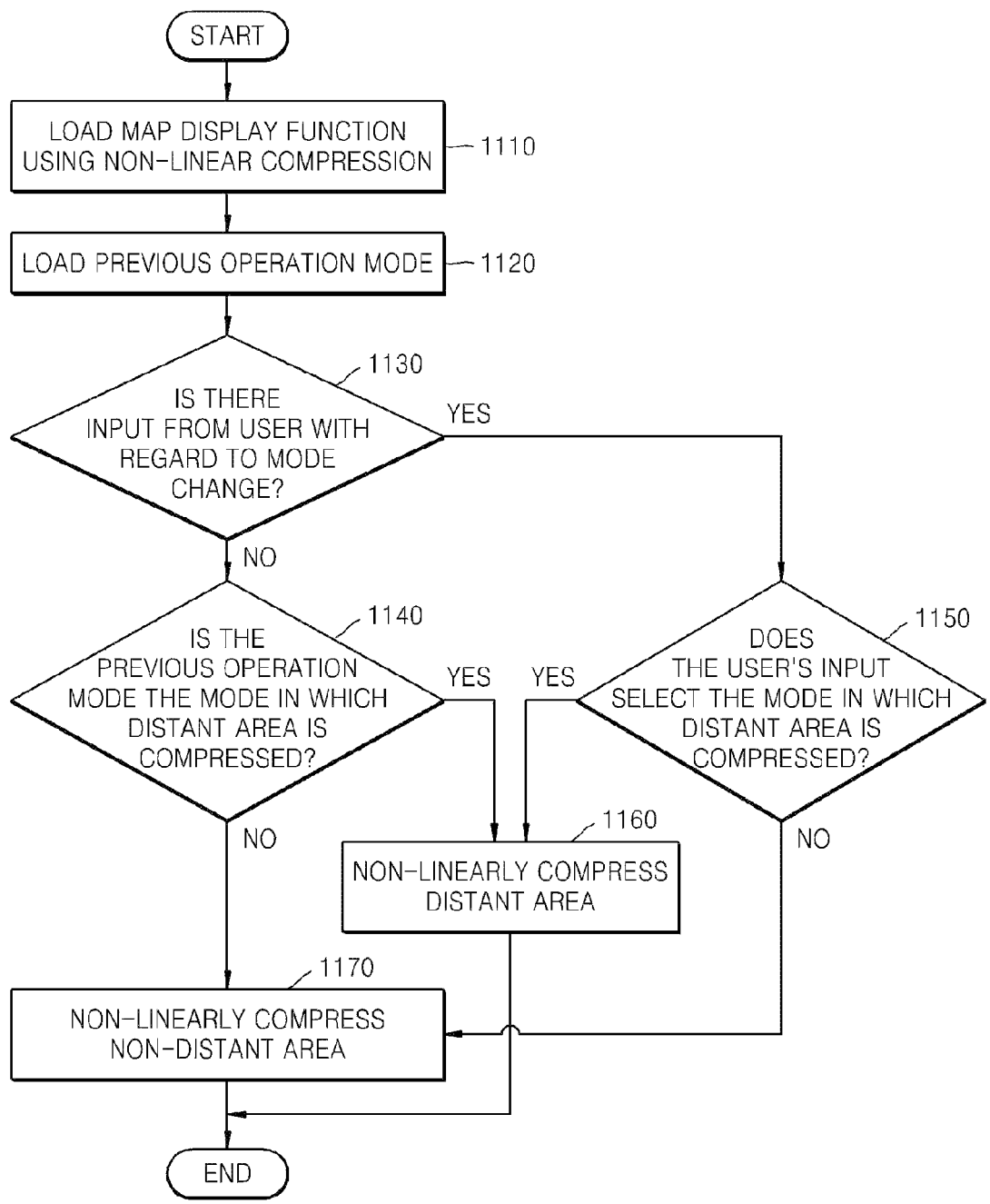
FIG. 11 is a flowchart illustrating a method of selecting a screen compression mode according to an embodiment of the present invention.

FIG. 11 is a flowchart illustrating a method of selecting a screen compression mode according to an embodiment of the present invention. In particular, FIG. 11 illustrates a method of selecting between a mode in which a distant area is compressed and a mode in which a non-distant area is compressed as described with reference to FIGS. 9A and 9B.

Referring to FIG. 11, a map displaying apparatus loads a map displaying operation that uses non-linear compression according to aspects of the present invention in operation 1110. The map displaying operation establishes a first area that is not compressed and is displayed on a screen, non-linearly compresses a second area adjacent to the first area according to an distance from the first area to generate a third area, and displays the first and third areas on a display device. The map displaying apparatus can load the map displaying operation according to a user's input, though it is understood that aspects of the present invention are not limited thereto.

For example, according to other aspects, the map displaying apparatus may load the map displaying operation as a default when the map displaying apparatus is turned on.

The map displaying apparatus displays a map on the screen according to a previous operation mode (i.e., the mode in which the distant area is compressed or the mode in which the non-distant area is compressed) in operation 1120. According to an embodiment of the present invention, the map displaying apparatus does not directly display the map on the screen, but displays information on a currently established mode on the screen so as to allow a user to select the currently established mode or a new mode in operation 1130. However, it is understood that the map could first be displayed, and the information on the correct mode can be displayed at a request of a user, such as through a preferences menu.

In operation 1130, the map displaying apparatus determines whether there is an input by the user with regard to a mode change. The user's input may be through a button, a touch screen, voice activation, a rotatable dial, etc. of the map displaying apparatus. When the map displaying apparatus is realized as a touch screen, the user touches a predetermined user interface (UI) on the touch screen in order to input the user's instructions to the map displaying apparatus.

If the map displaying apparatus determines that there is no user's input (operation 1130), the map displaying apparatus determines whether the previous operation mode is the mode in which the distant area is compressed or the mode in which the non-distant area is compressed in operation 1140.

If the map displaying apparatus determines that the previous operation mode is the mode in which the distant area is compressed (operation 1140), the map displaying apparatus non-linearly compresses the distant area and displays the compressed distant area and the non-distant area that is not compressed on the screen in operation 1160.

If the map displaying apparatus determines that the previous operation mode is the mode in which the non-distant area is compressed (operation 1140), the map displaying apparatus non-linearly compresses the non-distant area and displays the compressed non-distant area and the distant area that is not compressed on the screen in operation 1170.

If the map displaying apparatus determines that there is an input from the user (operation 1130), the map displaying apparatus determines whether the mode selected by the user is the mode in which the distant area is compressed or the mode in which the non-distant area is compressed in operation 1150.

If the map displaying apparatus determines that the mode selected by the user is the mode in which the distant area is compressed (operation 1150), the map displaying apparatus proceeds to operation 1160. Conversely, if the map displaying apparatus determines that the mode selected by the user is the mode in which the non-distant area is compressed (operation 1150), the map displaying apparatus proceeds to operation 1170.

While not restricted thereto, aspects of the present invention can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed network-coupled computer systems so that the computer-readable code is stored and executed in a distributed fashion.

According to aspects of the present invention, information regarding a distant area or a non-distant area is non-linearly compressed and displayed on a single screen so that a map of a broader area can be displayed on the single screen. In spite of compression of a partial area, the naturally continuous distant area and the non-distant area are displayed on the single screen so that a user who views the map can quickly and easily view information from the map.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A map displaying method to display a map on a screen, the method comprising:
   establishing a first area on the map that is not compressed based on a current location of an object on the map;
   non-linearly compressing a second area adjacent to the first area at different compression ratios according to a distance from the first area to generate a third area; and
   displaying the first area and the third area on the screen such that a distance between an edge of the screen and a boundary of the third area and the first area in a moving direction of the object is greater than a distance between another boundary of the third area and the first area and another edge of the screen away from the moving direction.

2. The method as claimed in claim 1, wherein the non-linear compressing of the second area comprises:
   compressing a first portion of the second area at a first compression ratio and compressing a second portion of the second area, farther from the first area than the first portion, at a second compression ratio, greater than the first compression ratio, to generate the third area.

3. The method as claimed in claim 1, wherein the non-linear compressing of the second area comprises:
   compressing a first portion of the second area to display the first portion in a first reduced scale and compressing a second portion of the second area, farther from the first area than the first portion, to display the second portion in a second reduced scale, smaller than the first reduced scale, to generate the third area.

4. The method as claimed in claim 1, wherein the non-linear compressing of the second area comprises:
   non-linearly compressing the second area according to a ratio changing according to a log-scale relative to the distance to generate the third area.

5. The method as claimed in claim 1, wherein the first area is established to have a rectangle or a circle shape.

6. The method as claimed in claim 1, wherein the establishing of the first area comprises:
   establishing the first area having a first size on the map when the object has a first moving speed; and
   establishing the first area having a second size on the map, different from the first size, when the object has a second moving speed, greater than the first moving speed.

7. The method as claimed in claim 6, wherein the first size is less than the second size.

8. The method as claimed in claim 1, wherein the first area includes the current location of the object.

9. The method as claimed in claim 1, wherein the first area does not include the current location of the object.

10. The method as claimed in claim 9, wherein the first area is a predetermined distance away from the current location of the object in a moving direction of the object.

11. The method as claimed in claim 9, wherein the second area includes the current location of the object.

12. The method as claimed in claim 1, wherein the establishing of the first area comprises establishing the first area to include the current location or establishing the first area to exclude the current location according to a user selection.

13. The method as claimed in claim 1, wherein the non-linear compressing of the second area comprises:
   compressing a first portion of the second area at a first compression ratio and compressing a second portion of the second area, farther from the first area than the first portion, at a second compression ratio, less than the first compression ratio, to generate the third area.

14. The method as claimed in claim 1, wherein the second area surrounds the first area.

15. The method as claimed in claim 1, wherein the second area borders the first area on only one side of the first area.

16. A map displaying apparatus to display a map on a screen, the apparatus comprising:
   a non-compression area establishing unit to establish a first area on the map that is not compressed based on a current location of an object on the map and;
   a compression area generating unit to non-linearly compress a second area adjacent to the first area at different compression ratios according to a distance from the first area to generate a third area; and
   a display unit to display the first area and the third area on the screen such that a distance between an edge of the screen and a boundary of the third area and the first area in a moving direction of the object is greater than a distance between another boundary of the third area and the first area and another edge of the screen away from the moving direction.

17. The apparatus as claimed in claim 16, wherein the compression area generating unit compresses a first portion of the second area at a first compression ratio and compresses a second portion of the second area, farther from the first area than the first portion, at a second compression ratio, greater than the first compression ratio, to generate the third area.

18. The apparatus as claimed in claim 16, wherein the compression area generating unit compresses a first portion of the second area to display the first portion in a first reduced scale and compresses a second portion of the second area, farther from the first area than the first portion, to display the second portion in a second reduced scale, smaller than the first reduced scale, to generate the third area.

19. The apparatus as claimed in claim 16, wherein the compression area generating unit non-linearly compresses the second area according to a ratio changing according to a log-scale relative to the distance to generate the third area.

20. The apparatus as claimed in claim 16, wherein the first area is established to have a rectangle or a circle shape.

21. The apparatus as claimed in claim 16, wherein the non-compression area establishing unit establishes the first area having a first size on the map when the object has a first moving speed, and establishes the first area having a second size on the map, different from the first size, when the object has a second moving speed, greater than the first moving speed.

22. The apparatus as claimed in claim 21, wherein the first size is less than the second size.

23. The apparatus as claimed in claim 16, wherein:
   the boundary of the first area and the third area is perpendicular to the moving direction of the object.

24. The apparatus as claimed in claim 16, wherein the first area is includes the current location of the object.

25. The apparatus as claimed in claim 16, wherein the first area does not include the current location of the object.

26. The apparatus as claimed in claim 25, wherein the first area is a predetermined distance away from the current location of the object in a moving direction of the object.

27. The apparatus as claimed in claim 25, wherein the second area includes the current location of the object.

28. The apparatus as claimed in claim 16, wherein the non-compression area establishing unit establishes the first area to include the current location or establishes the first area to exclude the current location according to a user selection.

29. The apparatus as claimed in claim 16, wherein the compression area generating unit compresses a first portion of the second area at a first compression ratio and compresses a second portion of the second area, farther from the first area than the first portion, at a second compression ratio, less than the first compression ratio, to generate the third area.

30. The apparatus as claimed in claim 16, wherein the second area surrounds the first area.

31. The apparatus as claimed in claim 16, wherein the second area borders the first area on only one side of the first area.

32. A computer-readable recording medium storing a program for executing a method of claim 1 and implemented by at least one computer.

33. A map displaying method to display a map including a current location within a first or second area of the map on a screen of a navigation terminal, the method comprising:

non-linearly compressing the second area at different compression ratios according to a distance from the first area to generate a third area without compressing the first area; and displaying the first area and the third area on the screen such that a distance between an edge of the screen and a boundary of the third area and the first area in a moving direction is greater than a distance between another boundary of the third area and the first area and another edge of the screen away from the moving direction.

34. The method as claimed in claim 33, wherein the non-linear compressing of the second area comprises:

compressing a first portion of the second area at a first compression ratio and compressing a second portion of the second area, farther from the first area than the first portion, at a second compression ratio, other than the first compression ratio, to generate the third area.

35. The method as claimed in claim 33, wherein the first area includes the current location or the second area includes the current location according to a user selection.

36. A computer-readable recording medium storing a program for executing a method of claim 33 and implemented by at least one computer.

* * * * *

UNITED STATES PATENT AND TRADEMARK OFFICE
CERTIFICATE OF CORRECTION

PATENT NO. : 8,149,248 B2  
APPLICATION NO. : 12/327153  
DATED : April 3, 2012  
INVENTOR(S) : Byeong-Seob Ko et al.

Page 1 of 1

It is certified that error appears in the above-identified patent and that said Letters Patent is hereby corrected as shown below:

Column 12, Line 67, In Claim 24, delete "is includes" and insert -- includes --, therefor.

Signed and Sealed this  
Twelfth Day of June, 2012

David J. Kappos  
*Director of the United States Patent and Trademark Office*